Sept. 13, 1949.  C. C. KING  2,482,007
CLUTCH MECHANISM

Filed April 20, 1945  2 Sheets-Sheet 1

INVENTOR.
Carl C. King
BY
ATTORNEY.

Sept. 13, 1949.                    C. C. KING                   2,482,007
                                CLUTCH MECHANISM
Filed April 20, 1945                                      2 Sheets-Sheet 2
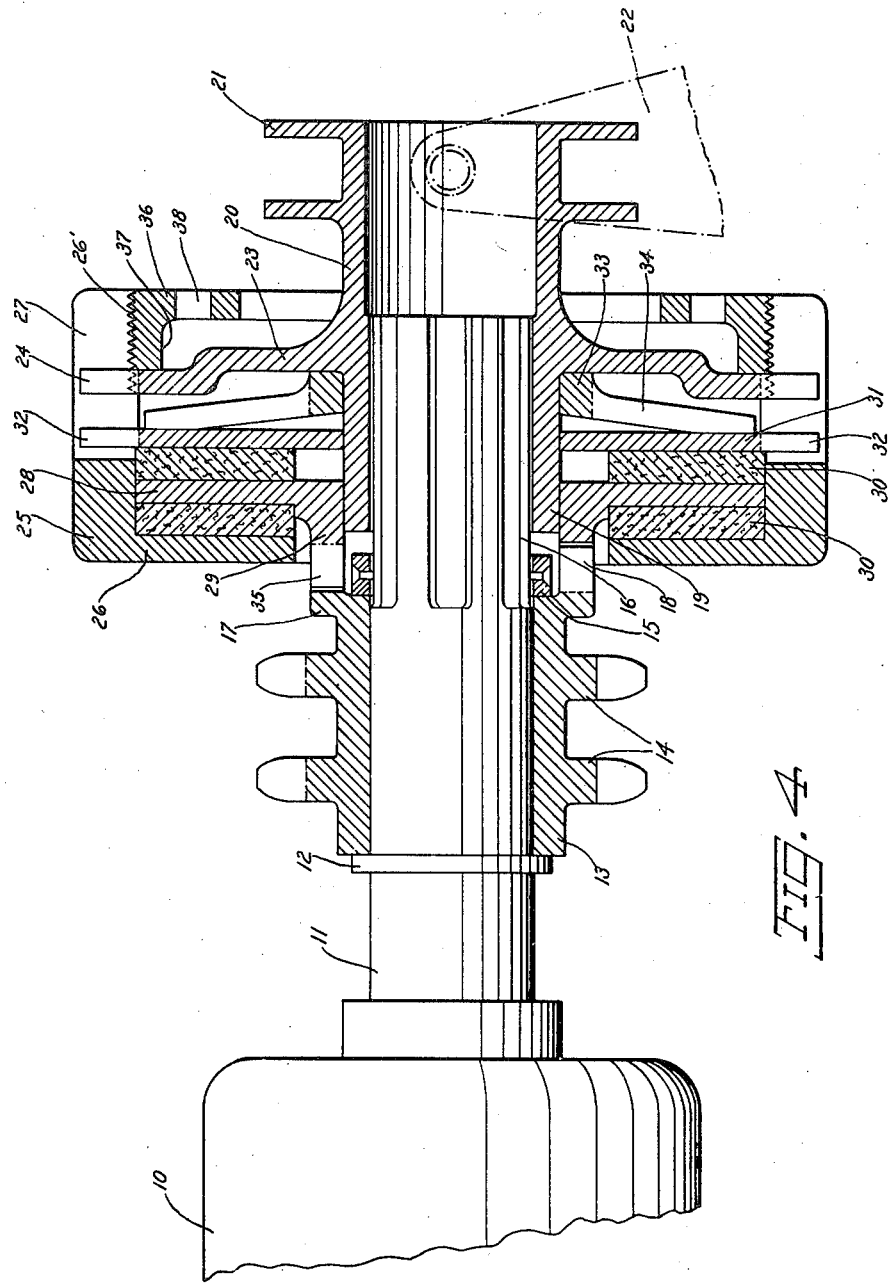
INVENTOR.
Carl C. King
BY Charles S. Williams
ATTORNEY.

Patented Sept. 13, 1949

2,482,007

UNITED STATES PATENT OFFICE 2,482,007

CLUTCH MECHANISM

Carl C. King, Massapequa, N. Y., assignor to Republic Aviation Corporation, Farmingdale, N. Y., a corporation of Delaware Application April 20, 1945, Serial No. 589,403

11 Claims. (Cl. 192—53)

This invention relates to couplings and is specially designed to provide a disengageable torque limit coupling between a driving and driven member.

Among its other objects the present invention proposes a coupling which will absorb the shocks of disengagement and engagement without damaging the elements of the coupling or the driving and driven member; and at the same time will compensate for operational conditions resulting in the arrestment of movement of either the driving or the driven member which might otherwise result in damage to said members or to the coupling.

With the above and other objects in view as will be apparent, this invention consists in the construction, combination and arrangement of parts all as hereinafter more fully described, claimed and illustrated in the accompanying drawings, wherein:

Fig. 4 is an enlarged central longitudinal section through the coupling.

Figure 1:
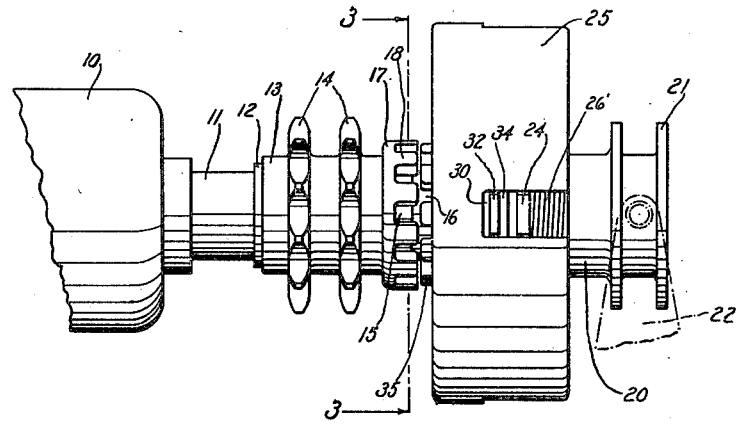
Fig. 1 is an outside elevation of a coupling constructed in accordance with the present invention, illustrating the same disengaged.
Figures 2, 3:
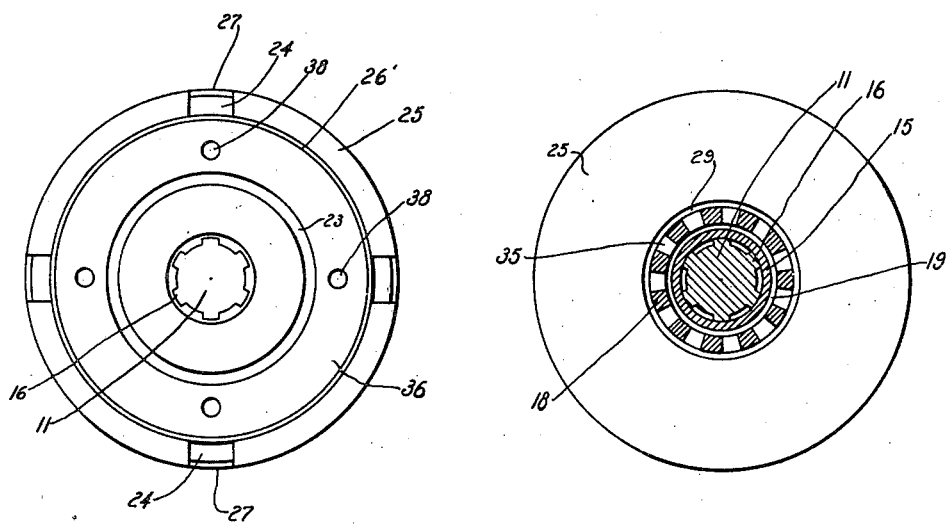
Fig. 2 is an end elevation thereof viewed from the right of Fig. 1.
Fig. 3 is a vertical transverse section through the coupling taken along line 3—3 of Fig. 1.

Reference being had more particularly to the drawings, 10 generally designates a motor or other source of power and any mechanism such as a reduction gear train that may be associated therewith for the rotation of the shaft 11. This structure, comprising a motor and associated mechanism and the shaft 11 rotated thereby, will hereinafter be generally considered as a unit constituting the driving member. A collar 12 mounted upon the shaft 11 abuts one end of the hub 13 of a sprocket 14 to position it on the shaft 11. The opposite end of this hub 13 abuts a companion collar 15 carried by the shaft 11 in spaced relation to the collar 12. Thus the hub 13 of the sprocket 14 is free to rotate upon the shaft 11 between the companion collars 12 and 15. These collars 12 and 15 coact with the opposed extremities of the hub 13 to position the sprocket on the shaft 11 and to hold it against any movement longitudinally of the shaft.

The free or outer end of the shaft 11 is splined, as at 16. The splines 16 terminate at their inner ends adjacent the hub 13 which is offset outwardly at 17 to project beyond the outer face of the collar 15. At its outer edge the offset 17 is provided with a series of parallel spaced engaging teeth 18 which overlie the ring 15 and rest parallel to the longitudinal axis of the shaft 11.

The present coupling is designed and intended to transmit rotary power from the shaft 11 to the hub 13 of the sprocket 14, utilizing for that purpose the teeth 18 carried by the offset 17 of the hub. This coupling is such that if the movement of the sprocket 14 is arrested for any reason the continued rotation of the shaft 11 will not be transmitted to the sprocket. Furthermore, the coupling is to be so constructed that it will absorb and compensate for the shock of engagement between the rotating shaft 11 and the load on the sprocket 14 or other driven member, to the end that the motor and associated mechanisms 10 will be undamaged by any sudden application of a load.

Among its other features the present coupling includes an adjustment by which the torque limit may be regulated and adjusted to meet varying conditions and loads.

A sleeve 19 structurally cooperates with the splines 16 of the shaft 11 to slide upon and rotate with the shaft 11. At its outer extremity this sleeve is provided with an extension 20 having a pair of spaced flanges 21 which cooperate with the ends of a fork 22. The swinging of the fork 22 about a fixed pivot (not shown) causes the sleeve 19 to slide longitudinally upon the splined extremity 16 of the shaft toward and away from the hub 13 of the sprocket 14. This reciprocable sleeve 19 has an outstanding connecting flange 23 fixed thereto adjoining the extension 20 and at its periphery this flange 23 is provided with the radially projecting ears 24. Surrounding the splined extremity 16 of the shaft 11 is a housing 25 closed at one of its sides by the end wall 26 adjoining the sprocket 14 and open at its opposed side. The open end of the housing 25 is internally threaded, as at 26', and has a series of spaced, parallel slots 27 for the reception of the ears 24 of the flange 23, one of said ears projecting and operating in each of said slots. By the connection between the ears 24 and the flange 23 with the slots 27 of the housing 25, the sleeve 19 may move relatively to the housing 25 and slide longitudinally on the shaft 11 and at the same time the housing 25 will rotate with the sleeve 19 and the shaft 11.

An outstanding clutch disk 28 is situated within the housing 25 near the end wall 26 and is slidably mounted upon the inner extremity of the sleeve 19 by means of a lateral bearing 29.

This disk projects into the housing 25 parallel or substantially parallel to the end wall 26 of the housing. A friction member or ring 30 is disposed upon each side of the clutch disk 28, each of which bears and operates against the adjoining face of the disk. It is manifest from the relationship of the parts that the friction rings 30 flank the disk 28 and frictionally connect it to the housing 25 by means of the coaction of one ring 30 with the end wall 26 of the housing and the coaction of the other ring 30 with a pressure member 31 loosely mounted upon the sleeve 19 between the flange 23 and the disk 28. Like the flange 23 the pressure member 31 is provided with a series of radial ears 32 each of which projects into one of the slots 27 of the housing 25 and is free to move therein longitudinally of the slot. Thus the housing 25 surrounds the aforesaid elements and its end wall 26, the pressure member 31 and the flange 23 rest substantially parallel one to the other and rotate in unison with the housing, the sleeve 19 and the shaft 11.

To insure an operating pressure within the coupling and between the elements thereof a bearing 33 is loosely mounted on the sleeve 19 between the flange 23 and the pressure member 31, and is provided with a series of radiating spring arms 34 that bear against the pressure member 31 at their outer extremities whereby the bearing 33 is abutted against the inner face of the flange 23. The pressure exerted by the spring arms 34 between the flange 23 and the pressure member 31 insures frictional, operative engagement between the pressure member 31, the clutch disk 28, the end wall 26 of the housing 25 and the friction rings 30, to the end that, under normal operative conditions, the housing 25, the clutch disk 28, the pressure member 31, the bearing 33 and its arms 34, and the flange 23 together with the sleeve 19 will rotate in unison with the shaft 11 and the driving member 10. This rotary motion of the aforesaid elements with the shaft 11 may be transmitted to the hub 13 of the sprocket 14 by a series of teeth 35 protruding outwardly from the bearing 29 of the clutch disk 28 parallel to the longitudinal axis of the shaft 11 and in the plane of the teeth 18 carried by the offset 17 of the hub 13.

When the sleeve 19 and its associated parts is positioned by the fork 22 as illustrated in Fig. 4, the teeth 18 and 35 interengage, thereby rotating the hub 13 in unison with the clutch disk 28 and its associated elements. Reversely, when the sleeve 19 is positioned by the fork 22 as illustrated in Fig. 1 with the teeth 35 out of engagement with the teeth 18 of the hub 13, the clutch disk 28 and its associated elements may continue to rotate in unison with the shaft 11 but this rotation is free of and not transmitted to the hub 13.

With the shaft 11 rotating the meshing of the teeth 18 and 35 manifestly places a great initial load upon the shaft 11 and the mechanism driving it, especially when it is proposed that the sprocket 14 be a working part designed to move a substantial load. If this meshing of the teeth 18 and 35 is done suddenly and there is no give or accommodation within the coupling, the motor or driving member 10 and its associated parts may be broken or damaged. Therefore if the loading on the sprocket 14 is excessive the present coupling provides for a slippage between the friction rings 30 and the clutch disk 28 which absorbs and accommodates all excessive forces and loads and will continue to do so until the load being moved by the sprocket 14 has attained sufficient momentum to prevent damage to the mechanisms driving it, whereupon the slippage ceases. This same slippage occurs when the movement of the sprocket 14 is arrested or the load thereon becomes excessive while the teeth 18—35 are meshed and the shaft 11 is being rotated.

In order to adjust the relative positions of the several elements of the coupling and to regulate and determine the pressure between the member 31, the clutch disk 28, the wall 26 of the housing 25 and the friction rings 30, an adjustment plate 36 operates in the open internally threaded end of the housing 25. The periphery of the adjustment plate 36 is provided with an outstanding or lateral shoulder 37. When located within the open end of the housing 25 the plate 36 rests parallel to the end wall 26 and its shoulder 37 always abuts the outer face of the flange 23 carried by the sleeve 19 adjoining the root ends of the ears 24. Spaced apertures 38 pierce the plate 36 near its circumference to provide a medium by which the plate may be engaged by a suitable tool to be rotated within the housing for adjusting its position and that of the flange 23 and sleeve 19 relative to the housing. As the plate 36 is rotated inwardly of the housing 25, the abutment between the shoulder 37 and the flange 23 causes a movement of the sleeve 19 and flange 23 inwardly of the housing 25 along the shaft 11 against the pressure of the spring arms 34. This increases the pressure exerted by the arms 34 upon the pressure member 31 and a corresponding increase of the pressure between the friction rings 30, the end wall 26, the clutch disk 28 and the pressure member 31. Such increases in pressure attained by the inward adjustment of the plate 36 progressively resists slippage between these elements and therefore it requires a greater load to cause slippage within the coupling. Reversely, as the plate 36 is threaded outwardly of the housing 25, the pressure of the spring arms 34 and bearing 33 causes the sleeve 19 and flange 23 to follow the retrograde movement of the plate 36 and its shoulder 37 with a resulting decrease in the pressure between the friction rings 30, the end wall 26, clutch disk 28 and pressure member 31. This decrease in frictional pressure causes a progressive decrease in the resistance to slippage between the elements of the coupling and a consequent decrease in the amount of load required to cause the clutch or coupling to slip. In short, a regulation of the position of the plate 36 within the open end of the housing 25 limits the capacity of the coupling to transmit the rotation to the shaft 11 to the sprocket 14 and thus the coupling may be so adjusted that the torque limits may be readily and accurately determined to meet the condition under which the clutch is intended to be operative.

While the coupling herein described is capable of wide application and use it is particularly designed for use in conjunction with the operating mechanism for a reciprocable aircraft canopy disclosed and described in co-pending application for Patent Serial Number 555,970, filed September 27, 1944.

What is claimed is:

1. The combination with a rotary driving shaft, of a driven member loosely mounted thereon, a series of spaced, parallel teeth protruding laterally from said driven member, a sleeve splined to said shaft for longitudinal reciprocation thereon, an operating member connected to said sleeve to adjust its position on the shaft, an outstanding flange carried by said sleeve, a series of spaced, radially disposed ears at the edge of and coplanar with said flange, a housing surrounding and spaced from said sleeve, having an end wall at one of its sides and provided with a series of spaced slots in its wall adjoining its opposite side, each for the reception of one of the ears of the flange aforesaid, a clutch disk situated within housing adjacent and parallel to its end wall, a series of spaced, parallel teeth projecting laterally from said clutch disk for meshing with the aforesaid similar teeth of the driven member, a pressure member parallel to and spaced from the clutch disk, a series of radially disposed ears at the periphery of the pressure member one for operation in each of the slots in the wall of the housing, friction rings interposed between the end wall of the housing and the clutch disk and between the clutch disk and the pressure member, a plate adjustably mounted in the slotted end of the housing having a shoulder on its inner face bearing against the flange carried by said sleeve, and spring arms disposed between said pressure member and said flange with their opposed extremities respectively bearing against the pressure member adjoining its circumference and against the flange adjoining the sleeve aforesaid.

2. The combination with a drive shaft having longitudinal splines at one of its ends, of a driven member freely mounted upon said shaft adjoining said splines, having teeth extending laterally therefrom parallel to the axis of the shaft, a clutch disk encircling said shaft, having teeth laterally projecting therefrom parallel to the axis of the shaft for operative interengagement with the teeth of the driven member, a sleeve operatively engaging the splines of the shaft, means associated with said sleeve for sliding it relatively to the shaft to mesh and disengage the teeth aforesaid, and means for driving said clutch disk from said sleeve and shaft comprising friction rings bearing against opposed faces of said clutch disk, a housing surrounding the sleeve and at one of its ends engaging one of said friction rings, a pressure plate bearing against the other of said friction rings, spring means operating against said pressure plate, an operative connection between said housing and said sleeve whereby the former rotates from and in unison with the latter, and means of adjustment for the tension of said spring means to regulate the frictional cooperation between the housing, the friction rings and the clutch disk.

3. The combination with a rotary drive shaft having splines at one of its ends, of a driven member freely mounted upon said shaft adjoining said splines, a sleeve having sliding operative engagement with said splines whereby said sleeve and shaft rotate in unison, a clutch disk loosely mounted upon one end of said sleeve, interengaging teeth respectively formed on said driven member and said clutch disk, a housing encircling and spaced from said sleeve, means fixed to the sleeve and having sliding engagement with the housing whereby said housing rotates in unison with the sleeve and shaft, and friction means interposed between said housing and said clutch disk for driving the latter.

4. The combination with a rotary drive shaft having splines at one of its ends, of a driven member freely mounted upon said shaft adjoining said splines, a sleeve having sliding operative engagement with said splines whereby said sleeve and shaft rotate in unison, a clutch disk loosely mounted upon one end of said sleeve, interengaging teeth respectively formed on said driven member and said clutch disk, a housing encircling and spaced from said sleeve, means whereby said housing rotates in unison with the sleeve and shaft, friction means operatively connecting said housing with said clutch disk, and adjustable means mounted within said housing to regulate the driving pressure between said friction means, the housing and the clutch disk.

5. The combination with a rotary shaft, of a sleeve slidably mounted thereon for rotation in unison therewith, a driven member loosely mounted on said shaft, and a disengageable torque limit connection operable between said sleeve and said driven member comprising a clutch disk loosely mounted upon said sleeve, a driving connection between said clutch disk and said driven member movable to and from its engaging position by the slidable movement of the sleeve aforesaid, a friction drive interposed between said sleeve and said clutch disk whereby said clutch disk rotates in unison with said sleeve, and means for adjusting said friction drive to predetermine the torque limits of said connection.

6. The combination with a rotary driving shaft, of a rotary driven member loosely mounted thereon, and a driving coupling between said shaft and said member comprising a supporting and connecting member slidably keyed to said shaft for rotation in unison therewith, an intermediate driving member loosely mounted on said supporting and connecting member, means for disengageably connecting said intermediate driving member to said driven member, and an adjustable drive between said supporting and connecting member and said intermediate driving member whereby said members may rotate in unison.

7. The combination with a rotary driving shaft, of a rotary driven member loosely mounted thereon, and a driving coupling between said shaft and said member comprising a supporting and connecting member slidably keyed to said shaft for rotation in unison therewith, an intermediate driving member loosely mounted on said supporting and connecting member, means for disengageably connecting said intermediate driving member to said driven member, a friction drive between said supporting and connecting member and said intermediate driving member whereby the said members rotate in unison, and means for adjustably predetermining the operative effectiveness of said drive.

8. The combination with a rotary driving shaft, of a rotary driven member loosely mounted thereon, and a driving coupling between said shaft and said member comprising a supporting and connecting member slidably keyed to said shaft for rotation in unison therewith, an intermediate driving member loosely mounted on said supporting and connecting member, means for disengageably connecting said intermediate driving member to said driven member, a housing encircling said supporting and connecting member, a connection between said housing and said supporting and connecting member whereby said housing rotates in unison with said member, a friction connection between said housing and said intermediate driving member, and means for adjusting the operative effectiveness of said friction drive.

9. The combination with a rotary driving shaft, of a rotary driven member loosely mounted thereon, and a driving coupling between said shaft and said member comprising a supporting and connecting member slidably keyed to said shaft for rotation in unison therewith, an intermediate driving member loosely mounted on said supporting and connecting member, means for disengageably connecting said intermediate driving member to said driven member, a housing encircling said supporting and connecting member, a connection between said housing and said supporting and connecting member whereby said housing rotates in unison with said member, friction members within said housing operating against said intermediate driving member, a pressure plate engaging said friction members between it and said housing, and means for regulating the pressure applied by said pressure plate by adjusting the relative positions of said housing and said supporting and connecting member.

10. The combination with a rotary driving shaft, of a rotary driven member loosely mounted thereon, and a driving coupling between said shaft and said member comprising a supporting and connecting member slidably keyed to said shaft for rotation in unison therewith, an intermediate driving member loosely mounted on said supporting and connecting member, means for disengageably connecting said intermediate driving member to said driven member, a housing encircling said supporting and connecting member, a slidable connection between said housing and said supporting and connecting member whereby the housing rotates in unison with the member and may be adjustable axially with relation thereto, a friction drive interposed between the intermediate driving member and the housing whereby they rotate in unison, and means for adjusting the operative effectiveness of said friction drive.

11. The combination with a driving shaft, of a driven hub freely mounted on said shaft, a supporting and connecting member slidably mounted on said shaft for rotation therewith, a clutch disk freely mounted on said supporting and connecting member, a releasable connection between said disk and said driven hub, and adjustable connection between said disk and the supporting and connecting member whereby they may rotate in unison.

CARL C. KING.

REFERENCES CITED

The following references are of record in the file of this patent:

UNITED STATES PATENTS

| Number | Name | Date |
|---|---|---|
| 321,656 | Stolterfoht | July 7, 1885 |
| 989,007 | Hanson | Apr. 11, 1911 |
| 1,427,025 | Schlafly | Aug. 22, 1922 |
| 1,455,479 | Daggett | May 15, 1923 |

FOREIGN PATENTS

| Number | Country | Date |
|---|---|---|
| 177,151 | Great Britain | July 6, 1922 |
| 315,717 | Italy | Mar. 6, 1934 |